United States Patent [19]
Hsieh

[11] 3,755,197

[45] Aug. 28, 1973

[54] CATALYST SYSTEM COMPRISING AN ORGANOALUMINUM OR AN ORGANOZINC AND A METAL SALT OF A CARBOXYLIC ACID

[75] Inventor: Henry L. Hsieh, Bartlesville, Okla.

[73] Assignee: Phillips Petroleum Company, Bartlesville, Okla.

[22] Filed: Feb. 20, 1969

[21] Appl. No.: 801,182

Related U.S. Application Data
[62] Division of Ser. No. 462,122, June 7, 1965.

[52] U.S. Cl. .......................... 252/431 C, 260/2 EP
[51] Int. Cl. .............................................. C08d 1/14
[58] Field of Search ............... 260/2 EP; 252/431, 252/431 C

[56] References Cited
UNITED STATES PATENTS

| | | | |
|---|---|---|---|
| 3,095,406 | 6/1963 | Short et al. ...................... | 252/431 X |
| 3,219,591 | 11/1965 | Vandenberg ......................... | 252/431 |
| 3,247,175 | 4/1966 | Volkenburgh et al. .......... | 252/431 X |
| 3,284,431 | 11/1966 | Gippin ............................ | 252/431 X |
| 3,313,846 | 4/1967 | Slovinsky ........................ | 252/431 X |
| 3,385,800 | 5/1968 | Furukawa et al. ................. | 260/2 EP |
| 3,399,149 | 8/1968 | Garty et al. ......................... | 260/2 EP |
| 3,457,186 | 7/1969 | Marsico ........................... | 252/431 X |

*Primary Examiner*—Patrick P. Garvin
*Attorney*—Young and Quigg

[57] ABSTRACT

A polymerization catalyst comprising (a) an organometallic compound selected from the group consisting of organoaluminum and organozinc compounds and (b) a metal salt of a carboxylic acid.

15 Claims, No Drawings

CATALYST SYSTEM COMPRISING AN ORGANOALUMINUM OR AN ORGANOZINC AND A METAL SALT OF A CARBOXYLIC ACID

This application is a division of my pending application Ser. No. 462,122, filed June 7, 1965.

This invention relates to catalyst systems which can be used for polymerizing alkene oxides.

The literature including the patent art describes a variety of different processes for polymerizing alkene oxides to produce polymers. It has been suggested that ethylene oxide and propylene oxide can be polymerized in the presence of a metal salt of an organic acid. In general, this process results in the formation of a product which ranges in consistency from a liquid to a waxy solid. Other prior art processes of polymerizing alkene oxides involve the use of an organometallic compound as a catalyst. Catalysts of this type have not met with commercial success because of the extremely low monomer conversion rate. Moreover, the polymer products produced by means of the organometallic catalyst range from liquids to high molecular weight waxy solids having almost no elastic properties.

According to this invention, these and other disadvantages of the prior art processes are overcome by means of a novel catalyst system comprising an organometallic compound and a metal salt of an organic acid. The organometallic portion of the catalyst can be an organozinc or an organoaluminum compound such as diorganozinc compounds, organozinc monohalides, organozinc monohydrides, triorganoaluminum compounds, organoaluminum monohalides, organoaluminum monohydrides, organoaluminum dihalides, organoaluminum dihydrides, and organoaluminum sesquihalides. The above-identified compounds can be prepared by a variety of different processes well known in the art.

The metal salt of the organic acid in the novel catalyst of this invention is a carboxylate of a metal selected from Groups IIA, IIIA, IVA, IIB, VIB, VIIB, and VIII of the Periodic Table of the Elements reported in the "Handbook of Chemistry and Physics," 45th Edition, page B-2, The Chemical Rubber Company (1964). The metal salts used in the catalyst can be prepared by different techniques well known in the art. For example, the desired metal in the form of the hydroxide can be reacted with the desired acid to form the corresponding metal salt. Since the actual technique employed for producing this portion of the catalyst forms no part of the invention, its method of preparation must not be construed as limiting of the invention.

Accordingly, it is an object of this invention to provide a novel catalyst which can be used for polymerizing alkene oxides.

Other objects of the invention will become apparent to one skilled in the art after studying the following detailed description and the appended claims.

The novel catalyst of this invention can be used for polymerizing any alkene oxide to form a rubbery polymer having good flexibility and elasticity. For example, alkene oxides containing up to and including 20 carbon atoms per molecule can be polymerized. Generally, it is preferred that the alkene oxide monomer contain from about two to about eight carbon atoms. Alkene oxides which can be polymerized in accordance with this invention can be represented by the formula

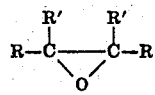

wherein R and R' are selected from the group consisting of hydrogen, saturated aliphatic, saturated cycloaliphatic, monoolefinic aliphatic, diolefinic aliphatic (conjugated and nonconjugated), monoolefinic cycloaliphatic, diolefinic cycloaliphatic (conjugated and nonconjugated), and aromatic radicals and combinations of these such as aralkyl, alkaryl, and the like. Some or all of the R and R' radicals can be halogen-substituted, and can contain oxygen in the form of an acyclic ether linkage (—O—) or an oxirane group

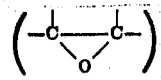

Further, the alkene oxides represented by the above formula can contain 1 or 2 olefinic linkages, 1 or 2 oxirane groups, and up to 1 ether linkage. In addition, both R' variables can represent a divalent aliphatic hydrocarbon radical which, together with the carbon atoms of the oxirane group, can form a cycloaliphatic hydrocarbon nucleus containing from about four to about 10 carbon atoms and preferably from about four to about eight carbon atoms.

Specific examples of some of the alkene oxides which are within the above structural formula and which can be homopolymerized or copolymerized using the catalyst system of this invention are ethylene oxide (epoxyethane); 1,2-epoxypropane (propylene oxide); 1,2-epoxybutane; 2,3-epoxybutane; 1,2-epoxypentane; 2,3-epoxypentane; 1,2-epoxyhexane; 3,4-epoxyhexane; 1,2-epoxyheptane; 2,3-epoxyoctane; 2,3-dimethyl-2,3-epoxypentane; 1,2-epoxy-4-methylpentane; 2,3-epoxy-5-methylhexane; 1,2-epoxy-4,4-dimethylpentane; 4,5-epoxyeicosane; 1-chloro-2,3-epoxypropane (epichlorohydrin); 1-bromo-2,3-epoxypropane; 1,5-dichloro-2,3-epoxypentane; 2-iodo-3,4-epoxybutane; styrene oxide; 6-oxabicyclo[3.1.0]hexane; 7-oxabicyclo[4.1.0.]heptane; 3-propyl-7-oxabicyclo[4.1.0]heptane; bis(2,3-epoxypropyl)ether; tert-butyl 4,5-epoxyhexyl ether; and 2-phenylethyl 3,4-epoxybutyl ether.

Unsaturated alkene oxides within the above structural formula, including ethers, which an be homopolymerized or copolymerized with the saturated alkene oxides include allyl 2,3-epoxypropyl ether (allyl glycidyl ether); allyl 3,4-epoxybutyl ether; 1-methallyl 3,4-epoxyhexyl ether; 3-hexenyl 5,6-epoxyhexyl ether; 2,6-octadienyl 2,3,7,8-diepoxyoctyl ether; 6-phenyl-3-hexenyl 3-ethyl-5,6-epoxyhexyl ether; 3,4-epoxy-1-butene (butadiene monoxide); 3,4-epoxy-1-pentene; 5-phenyl-3,4-epoxy-1-pentene; 1,2,9,10-diepoxy-5-decene; 6,7-di-n-butyl-3,4,9,10-diepoxy-1,11-dodecadiene; epoxy vinyl ether; allyl 2-methyl-2,3-epoxypropyl ether; 3-cyclohexyl-2-propenyl 4-cyclohexyl-3,4-epoxybutyl ether; 2,4-pentadienyl 2,3-diethyl-3,4-epoxybutyl ether; 1-methallyl 6-phenyl-3,4-epoxyhexyl ether; 5-(4-tolyl)2,3-epoxypentyl vinyl ether; bis[4-(3-cyclopentenyl)2,3-epoxybutyl] ether; 2-(2,4-cyclohexadienyl)ethyl 2,3-epoxybutyl ether; 2-(2,5-cyclohexadienyl)ethyl 2-benzyl-4,5-epoxypentyl ether; 3,4-epoxy-1,5-hexadienyl isopropyl ether; allyl 3,4-dimethyl-3,4-epoxyhexyl ether; 3,4- epoxy-4-(2,3-dimethylphenyl)1-butene; 3,4-dimethyl-3,4-epoxy-1-pentene; 5-(4-methylcyclohexyl)3,4-epoxy-1-pentene; 4,5-diethyl-4,5-epoxy-2,6-octadiene; 4-(2,4-cyclopentadienyl)1,2,6,7-diepoxyheptane; and 1-phenyl-1,2-epoxy-5,7-octadiene.

The catalyst of this invention comprises an organometallic compound and a metal salt of an organic acid. The catalyst can be prepared and used by mixing the organometallic compound with the metal salt of the organic acid prior to or during the polymerization reaction. The organometallic portion of the catalyst can be represented by the formula

$$R''_n MX_m$$

wherein R'' is a hydrocarbon radical selected from the group consisting of saturated aliphatic, saturated cycloaliphatic, and aromatic containing from one to 20 carbon atoms, inclusive, and combinations such as aralkyl, alkaryl, and the like; M is a metal selected from the group consisting of aluminum and zinc; X is a member of the class consisting of hydrogen, fluorine, chlorine, bromine, and iodine; n is an integer of from 1 to 3, inclusive; m is an integer of from 0 to 2, inclusive; and the sum of the integers n and m equals the valence of the metal M. Organozinc and organoaluminum compounds within the above formula include diorganozinc compounds, triorganoaluminum compounds, organozinc monohalides, organozinc monohydrides, organoaluminum monohalides, organoaluminum dihalides, organoaluminum sesquihalides, organoaluminum monohydrides, and organoaluminum dihydrides. The organoaluminum sesquihalides as herein defined are intended to mean a mixture of organoaluminum monohalides and organoaluminum dihalides of the formulas $R''_2AlX$ and $R''AlX_2$, respectively, wherein R'' is the same as hereinbefore defined with respect to the general formula and X is a halogen. The organoaluminum sesquihalides can then be written as $R''_3Al_2X_3$ or as $R''_{1\ 1/2}AlX_{1\ 1/2}$. Exemplary organometallic compounds within the above general formula include trimethylaluminum; triethylaluminum; tri-n-propylaluminum; triisobutylaluminum; tri-n-hexylaluminum; tri-n-octylaluminum; tricyclohexylaluminum; triphenylaluminum; tri-n-butylaluminum; tri-n-decylaluminum; tri-n-eicosylaluminum; methyldiphenylaluminum; tribenzylaluminum; bis(3,5-heptylphenyl)methylaluminum; tri-1-naphthylaluminum; di-n-octylphenylaluminum; tri-4-tolylaluminum; dimethylchloroaluminum; methyldichloroaluminum; methylisobutylchloroaluminum; n-heptyldifluoroaluminum; diphenylbromoaluminum; dibenzylchloroaluminum; di-n-octylchloroaluminum; n-octylphenylchloroaluminum; di-n-eicosyliodoaluminum; n-butyldihydroaluminum; methyldihydroaluminum; diisopropylhydroaluminum; ethylmethylhydroaluminum; diphenylhydroaluminum; benzyl-n-dodecylhydroaluminum; bis(2,4,6-tri-n-butyloctyl)hydroaluminum; dimethylzinc; diethylzinc; di-n-propylzinc; diisopropylzinc; di-n-butylzinc; diisobutylzinc; di-n-amylzinc; di-n-hexylzinc; di-n-octylzinc; di-n-dodecylzinc; dicyclopentylzinc; dicyclohexylzinc; bis(2,5-dimethylcyclopentyl)zinc; bis(3,5-dimethylcyclohexyl)zinc; diphenylzinc; bis(2-hexyltetradecyl)zinc; bis(4-cyclohexyloctyl)zinc; bis(2-n-butylcyclohexyl)zinc; bis(2,4,8-trimethylhendecyl)zinc; bis(7-pentyltetradecyl)zinc; bis[2-(2,3,5-tri-n-butylphenyl)ethyl]zinc; dibenzylzinc; bis(4,6-dicyclopentyldecyl)zinc; methylethylzinc; ethylisopropylzinc; n-propyl-n-hexylzinc; methylchlorozinc; ethylbromozinc; n-propylchlorozinc; n-amylbromozinc; n-hexyliodozinc; n-octylchlorozinc; cyclopentylchlorozinc; cyclohexylbromozinc; 2-hexyltetradecylchlorozinc; 7-pentyltetradecylbromozinc; benzylbromozinc; 4,6-dicyclopentyldecylbromozinc; dodecylfluorozinc; 3,5-methylcyclohexylchlorozinc; cyclohexyliodozinc; methylhydrozinc; cyclohexylhydrozinc; n-eicosylhydrozinc; 4-tolylhydrozinc; and n-amylhydrozinc.

The other component in the catalyst of this invention is a carboxylate of a metal selected from the group consisting of Groups IIA, IIIA, IVA, IIB, VIB, VIIB, and VIII of the Periodic Table of the Elements reported in the "Handbook of Chemistry and Physics," 45th Edition, page B-2, The Chemical Rubber Company (1964). Preferred metals within the above groups include beryllium, magnesium, calcium, strontium, barium, zinc, cadmium, mercury, boron, aluminum, gallium, indium, thallium, silicon, germanium, tin, lead, chromium, molybdenum, manganese, iron, cobalt, and nickel.

The organic acid which can be reacted or combined with the above metals can be selected from the group consisting of mono- and polycarboxylic aliphatic acids, mono- and polycarboxylic cycloaliphatic acids, and mono- and polycarboxylic aromatic acids. It is preferred that the acid be selected from the group consisting of unsubstituted aliphatic hydrocarbon mono-, di-, and tricarboxylic acids containing from one to 30 carbon atoms per molecule, inclusive; unsubstituted cycloaliphatic hydrocarbon mono-, di-, and tricarboxylic acids containing up to and including 30 carbon atoms per molecule; and unsubstituted aromatic hydrocarbon mono-, di-, and tricarboxylic acids containing up to and including three aromatic rings per molecule.

Exemplary saturated and unsaturated acids which are within this group and which can be used in the practice of this invention include formic; acetic; propionic; butyric; caproic; capric; lauric; trideacanoic; stearic; palmitic; myristic; arachidic; behenic; tetracosanoic; triacontanoic; acrylic; maleic; crotonic; 3-butenoic; oleic; linoleic; linolenic; arachidonic; oxalic; malonic; succinic; sabacic; pimelic; 1,2,3-propanetricarboxylic; 1,1,5-pentanetricarboxylic; 1,2,4-hexanetricarboxylic; 5-octene-2,3,6-tricarboxylic; cyclobutanecarboxylic; cyclopentanecarboxylic; 4-methylcyclohexanecarboxylic; 2,6-di-n-heptyl-4-n-nonylcyclohexanecarboxylic; 2,2,6-trimethylcyclohexanecarboxylic; cyclopentylacetic; 3-methylcyclopentylacetic; 2-cyclopentene-1-malonic; benzoic; 2-naphthoic or 2-naphthalenecarboxylic; 6,7-diethyl-1-naphthalenecarboxylic; 1,4-naphthalenedicarboxylic; 1,8-naphthalenedicarboxylic; 1-anthracenecarboxylic; 3-phenanthrenecarboxylic; 1-phenanthrenebutyric; phthalic; terephthalic; 1,2,3-benzenetricarboxylic; 1,3,5-benzenetricarboxylic; 1,4,6-naphthalenetricarboxylic; 3-carboxycinnamic; 1-naphthaleneacrylic; cyclooctanecarboxylic acid; 1,5-cyclooctadiene-1-carboxylic acid; 3-cyclohexene-1-carboxylic acid; 1-cyclohexene-1,2-dicarboxylic acid; cyclotridecanecarboxylic acid; 5-propyl-8,9,12-tri-n-butylcyclotetradecanecarboxylic acid; and cyclopentadecanecarboxylic acid.

The monomer conversion ate can be increased by effecting the polymerization in the presence of the novel catalyst system plus water as a third component. In the practice of this modification, the water can be employed in an amount within the range of from about 1 to about 100 gram millimoles per 100 grams of monomer and preferably within the range of from about 5 to about 40 gram millimoles per 100 grams of monomer. It is obvious that lesser amounts of water can be used if desired.

Although the mount of catalyst used for effecting polymerization of the alkene oxides can be varied over a rather broad range, it is preferred that the organometallic component of the catalyst be present in an amount within the range of from about 1 to about 100 gram millimoles per 100 grams of monomer and preferably within the range of from about 5 to about 40 gram millimoles per 100 grams of monomer. The metal salt of the organic acid can be present in an amount within a rather wide range. For example, the metal salt can be present in an amount within the range of from about 0.3 to about 15 gram millimoles per 100 grams of monomer and preferably within the range of from about 1.5 to about 8 gram millimoles per 100 grams of monomer. The organometallic and carboxylic acid metal salt components of the catalyst systems are present in amounts such as to provide a molar ratio of organometallic compound to carboxylic acid metal salt in the range of 0.067:1 to 333:1. In the copolymerization of two or more alkene oxide monomers, the amount of each of the components in the catalyst is based on the total amount of all the monomers.

The alkene oxide polymerization reaction can be carried out either as a batch process or as a continuous process with the novel catalyst system being added in a single initial charge or in predetermined increments during polymerization. Similarly, the monomers may be introduced into the reaction zone in one charge or they may be added gradually during polymerization. In order to expedite and improve the efficiency of the polymerization reaction, it is generally preferred that the reaction be carried out in the presence of an inert diluent. Suitable diluents which can be used for this purpose include paraffinic, cycloparaffinic, and aromatic hydrocarbons containing from about four to about 10 carbon atoms per molecule. Exemplary diluents which can be used are butane, pentane, hexane, decane, cyclopentane, cyclohexane, methylcyclohexane, benzene, toluene, xylene, ethylbenzene, and the like. It is also within the spirit and scope of the invention to employ halogenated hydrocarbons such as chlorobenzene and the like as diluents. Since the actual diluent employed is largely a matter of choice, it is obviously possible to mploy other diluents than those herein identified without departing from the spirit and scope of the invention. Mixtures of suitable compounds can also be employed as diluents.

The temperature and pressure at which the polymerization process is effected can vary over a rather wide range. Generally, the polymerization is conducted at a temperature within the range of from about 40° to about 250° F. and preferably within the range of from about 85° to about 200° F. Polymerization is usually conducted at a pressure which will maintain the materials in the liquid state. It is obvious that the reaction can be conducted at superatmospheric pressures of several thousand pounds if desired.

The duration of the polymerization reaction will depend primarily upon temperature, pressure, and catalyst activity. Usually, the process will be conducted for a period of from a few minutes or less to about 100 hours or more.

The alkene oxide polymers and copolymers produced in accordance with the catalyst system of this invention exhibit extremely good low temperature flexibility. The polymers and copolymers are particularly resistant to the effects of heat and to the effects of ozone. The alkene oxide polymers have unlimited utility in the automobile industry for fabricating articles such as motor mounts, body mounts, suspension system parts, hoses, tubing, and the like.

The following examples will serve to illustrate the operability of the catalyst system of this invention. It is to be understood that such examples are for the purpose of illustration only, and that many variations and modifications can be made from the various examples without departing from the concept of the invention

EXAMPLES 1-8

A series of runs was conducted whereby propylene oxide was polymerized by means of the catalyst system of this invention. In the several runs made, the metal salt of the organic acid in the catalyst system was varied to illustrate the operability of the invention with the various groups of metals hereinbefore disclosed. Triisobutylaluminum was used as the organometallic component is the catalyst. The materials were charged to a reactor in the following proportions:

| | |
|---|---|
| Propylene oxide, parts by weight | 100 |
| Toluene, parts by weight | 860 |
| Triisobutylaluminum, mhm* | 30 |
| Metal stearate, parts by weight | 3 |
| Temperature, °F. | 158 |
| Time, hours | 48 |

*gram millimoles per 100 grams propylene oxide.

The actual polymerization technique employed involved the steps of charging the reactor with toluene and thereafter purging it with nitrogen. The metal salt of the stearic acid portion of the catalyst was then charged to the reactor followed by the propylene oxide and the triisobutylaluminum. At the termination of each run, those reaction mixtures which were viscous were diluted with acetone to reduce the viscosity of the mass. Approximately 1 weight percent, based on the polymer, of 2,2'-methylene-bis(4-methyl-6-tert-butylphenol) antioxidant was added. Each reaction mixture was then poured into water which had been acidified with hydrochloric acid. This mixture was subsequently separated into an aqueous phase and an organic phase. The organic phase was removed and the polymer was recovered from it by evaporating the diluent. The recovered polymer was then dissolved in acetone and coagulated in water for the purpose of removing residual amounts of the metal salt. The polymer products were then dried under vacuum. All of the polymers produced were rubbers. Those having the lower inherent viscosities were soft rubbers. Table I below illustrates the results of each of the runs and the properties of each of the rubber polymers produced.

TABLE I

| Example No. | Metal Stearate Type | mhm* | Monomer Conversion % | Inherent Viscosity |
|---|---|---|---|---|
| 1 | Ca++ | 4.9 | 50 | 1.29 |
| 2 | Ba++ | 4.2 | 52 | 1.08 |
| 3 | Zn++ | 4.8 | 68 | 1.99 |

| | | | | |
|---|---|---|---|---|
| 4 | Fe++ | 4.8 | 52 | 1.49 |
| 5 | Al+++ | 3.3 | 61 | 1.43 |
| 6 | Cd++ | 4.4 | 63 | 1.56 |
| 7 | Pb++ | 3.8 | 51 | 1.94 |
| 8 | Mg++ | 5.1 | 56 | 1.63 |

*mhm = gram millimoles per 100 grams propylene oxide. viscosity

In order to determine the inherent viscosity, one-tenth gram of polymer was placed in a wire cage made from 80-mesh screen and the cage was placed in 100 ml of toluene contained in a wide-mouth, 4-ounce bottle. After standing at room temperature (approximately 77° F.) for about 24 hours, the cage was removed and the solution filtered through a sulfur absorption tube of grade C porosity to remove any solid particles present. The resulting solution was run through a Medalia type viscometer supported in a 77° F. bath. bath. The viscometer was previously calibrated with toluene. The relative viscosity is the ratio of the viscosity of the polymer solution to that of toluene. The inherent viscostiy is calculated by dividing the natural logarithm of the relative viscosity by the weight of the soluble portion of the original sample.

A separate run was made with a catalyst comprising only triisobutylaluminum in accordance with the polymerization technique employed in Examples 1-8. The polymer produced in this run was a liquid thus illustrating the important effect of the metal salt of the organic acid in the acid in the catalyst system. Separate runs were also made using each of the metal stearates employed in Examples 1-8 as the sole catalyst in accordance with the polymerization technique used in Examples 1-8. Only a trace of liquid polymer was formed in each of the runs made. These control runs show the unexpected result and the improved polymer obtained by utilizing both components of the catalyst.

EXAMPLES 9-16

A series of runs was made whereby propylene oxide was polymerized by means of a catalyst comprising diethylaluminum chloride and a metal salt of stearic acid. The metal in the salt of the stearic acid was changed to illustrate the operability of the catalyst with different metals. The materials were charged to the reactor in the same proportions and by the same technique as was employed in the polymerization described in Examples 1-8 except that 30 millimoles of diethylaluminum chloride was substituted for the 30 millimoles of triisobutylaluminum. The reaction was conducted for a period of 48 hours at a temperature of 158° F. The results obtained from these examples are reflected in Table II below.

TABLE II

| Example No. | Metal Stearate Type | mhm* | Monomer Conversion % | Inherent Viscosity |
|---|---|---|---|---|
| 9 | Ca++ | 4.9 | 40 | 1.91 |
| 10 | Ba++ | 4.2 | 43 | 1.32 |
| 11 | Zn++ | 4.8 | 67 | 3.82 |
| 12 | Fe++ | 4.8 | 47 | 1.97 |
| 13 | Al+++ | 3.3 | 62 | 1.80 |
| 14 | Cd++ | 4.4 | 61 | 2.52 |
| 15 | Pb++ | 3.8 | 52 | 1.10 |
| 16 | Mg++ | 5.1 | 50 | 1.56 |

*mhm = gram millimoles per 100 grams propylene oxide.

The polymers produced by Examples 9-16 ranged from very soft to quite stiff rubbers. The polymers were recovered and inherent viscosity determined for Examples 9-16 using the same technique as that described in Examples 1-8.

Three runs were conducted whereby propylene oxide was polymerized in the presence of water with the catalyst of this invention to illustrate the effect obtained thereby. The materials were charged to the reactor in the same proportions and by the same technique used in Examples 1-8. In all three runs, 15 gram millimoles of water was added for each 100 grams of monomer. The water was added to the reactor after the triisobutylaluminum had been charged. The results obtained are presented in Table III below.

TABLE III

| Example No. | Metal Stearate Type | mhm* | Monomer Conversion % | Inherent Viscosity |
|---|---|---|---|---|
| 17 | Zn++ | 4.8 | 84 | 4.72 |
| 18 | Cd++ | 4.4 | 78 | 3.17 |
| 19 | Pb++ | 3.8 | 68 | not det'd |

*mhm = gram millimoles per 100 grams propylene oxide.

It should be noted that Examples 17, 18, and 19 are the same as Examples 3, 6, and 7, respectively, except for the presence of the water during polymerization. It can be seen from these data that higher conversions are obtained when water is employed in the catalyst. Further, the polymers have a higher inherent viscosity when water is used. The inherent viscosity and monomer conversion were determined in the same manner as described in connection with Examples 1-8.

Two additional runs were made in the presence of a variable amount of water and a catalyst consisting only of triisobutylaluminum. These runs were made without a metal salt of an organic acid to illustrate the necessity of the metal salt. The materials were charged to the reactor in the following proportions:

| | |
|---|---|
| Propylene oxide, parts by weight | 100 |
| Toluene, parts by weight | 430 |
| Triisobutylaluminum, mmoles* | 30 |
| Water, mmoles* | variable |
| Temperature, °F. | 158 |
| Time, hours | 48 |

*gram millimoles per 100 grams monomer.

The technique employed for charging the materials to the reactor was the same as that employed and described in connection with Examples 1-8. The results obtained from these runs are reported in Table IV below.

TABLE IV

| Run No. | Water,* Mmoles | Monomer Conversion (%) | Inherent Viscosity |
|---|---|---|---|
| 1 | 5 | 78 | 0.39 |
| 2 | 30 | 70 | 0.56 |

*gram millimoles per 100 grams monomer.

The polymer products produced in Runs 1 and 2 were both liquids. It is apparent from these data that a metal salt of an organic acid of the class described is a necessary constituent in the catalyst in order to obtain a rubbery polymer. It can also be concluded from a comparison of the results in Examples 17-19 and the results in Runs 1 and 2 that the metal salt of the organic acid is a necessary component in the catalyst when the polymerization reaction is effected in the presence of water.

As hereinbefore indicated, any unsaturated alkene oxide can be homopolymerized or copolymerized by means of the catalyst of this invention to form a rubbery polymer which can be sulfur vulcanized. In the copolymerization of propylene oxide and an unsaturated alkene oxide, it is preferred to employ allyl 2,3-epoxypropyl ether (allyl glycidyl ether) or 3,4-epoxy-1-butene (butadiene monoxide) in the formation of the copolymer. These copolymers are readily sulfur vulcanizable because the polymer chains contain a multiplicity of olefinic bonds. Polymerization conditions and techniques for copolymerizing two or more alkene oxides are the same as those employed in the homopolymerization of alkene oxides. Thus, factors such as catalyst level, temperature, pressure, and the like in the homopolymerization reaction can be employed in a like manner in the copolymerization reaction.

Although the invention has been described in considerable detail, it must be understood that such detail is for the purpose of illustration only and that many variations and modifications can be made by one skilled in the art without departing from the spirit and scope of the invention.

I claim:

1. A catalyst system consisting essentially of
   a. at least one organozinc compound of the formula $$R''_n ZnX_m ,$$

wherein $R''$ is a hydrocarbon radical selected from the group consisting of saturated aliphatic, saturated cycloaliphatic, and aromatic containing from one to 20 carbon atoms, inclusive; X is selected from the class consisting of hydrogen, fluorine, chlorine, bromine, and iodine; $n$ is a number whose value is 1 or 2; $m$ is a number whose value is 0 or 1; and the sum of $n$ and $m$ equals 2; and
   b. at least one salt of a carboxylic acid selected from the group consisting of aliphatic carboxylic acids having up to 30 carbon atoms per molecule, cycloaliphatic carboxylic acids having up to 30 carbon atoms per molecule, and aromatic carboxylic acids containing up to three aromatic rings per molecule and a metal selected from Groups IIA, IIIA, IIB, and VIIB of the periodic table; wherein the molar ratio of organozinc compound to carboxylic acid salt is the range of 0.067:1 to 333:1.

2. A catalyst system ccording to claim 1 including water in an amount such that the molar ratio of organozinc compound to water is within the range of about 0.01:1 to about 100:1.

3. A catalyst system according to claim 1 wherein the organozinc compound is selected from the group consisting of diorganozincs, organozinc monohalides, and organozinc monohydrides.

4. A catalyst system according to claim 1 wherein said acid is stearic acid.

5. A catalyst system according to claim 4 wherein said metal is selected from the group consisting of calcium, barium, zinc, aluminum, cadmium, and magnesium.

6. A catalyst system ccording to claim 2 wherein the salt of an acid is selected from the group consisting of zinc stearate, and cadmium stearate, 7. A catalyst system consisting essentially of:
   a. an organoaluminum compound of the formula $$R''_n AlX_m ,$$

wherein $R''$ is a hydrocarbon radical selected from the group consisting of saturated aliphatic, saturated cycloaliphatic, and aromatic containing from one to 20 carbon atoms, inclusive; X is a member selected from the group consisting of hydrogen, fluorine, chlorine, bromine, and iodine; $n$ is a number whose value is 1, 2, or 3; $m$ is a number whose value is 0, 1, or 2; and the sum of $n$ and $m$ is 3; and
   b. a slat of an acid selected from the group consisting of aliphatic carboxylic acids having up to 30 carbon atoms per molecule, cycloaliphatic carboxylic acids having up to 30 carbon atoms per molecule, and aromatic carboxylic acids containing up to three carbon rings per molecule and a metal selected from Groups IIA and IIIA of the periodic table; wherein the molar ratio of organoaluminum compound to carboxylic acid salt is in the range of 0.067:1 to 333:1.

8. A catalyst system according to claim 7 including water in an amount such that the molar ratio of organoaluminum compound to water is within the range of about 0.01:1 to about 100:1.

9. A catalyst system according to claim 7 wherein the organoaluminum compound selected from the group consisting of triorganoaluminums, organoaluminum monohalides, organoaluminum dihalides, organoaluminum sesquihalides, organoaluminum monohydrides, and organoaluminum dihydrides.

10. A catalyst system according to claim 7 wherein said acid is stearic acid.

11. A catalyst system according to claim 10 wherein said metal is selected from the group consisting of calcium, barium, aluminum, and magnesium.

12. A catalyst system ccording to claim 7 wherein the carboxylic acid salt is aluminum stearate.

13. A catalyst system according to claim 7 wherein the organometallic compound is triisobutylaluminum.

14. A catalyst system according to claim 7 wherein the organoaluminum compound is diethylaluminum chloride.

15. A catalyst system according to claim 8 wherein the organoaluminum compound is triisobutylaluminum.

* * * * *